United States Patent [19]

Derus

[11] E Patent Number: Re. 31,641

[45] Reissued Date of Patent: Aug. 7, 1984

[54] COLLAPSIBLE ARTICULATED WALL STRUCTURE

[75] Inventor: David L. Derus, Cleveland Heights, Ohio

[73] Assignee: Nomadic Structures, Inc., Alexandria, Va.

[21] Appl. No.: 452,220

[22] Filed: Dec. 22, 1982

Related U.S. Patent Documents

Reissue of:

[64] Patent No.: 4,276,726
Issued: Jul. 7, 1981
Appl. No.: 104,395
Filed: Dec. 17, 1979

[51] Int. Cl.[3] ..... E04H 12/18

[52] U.S. Cl. ..... 52/109; 52/646; 248/166; 248/432

[58] Field of Search ..... 52/109, 646; 248/166, 248/432, 165, 167, 431; 182/69, 141; 135/110, 109

[56] References Cited

U.S. PATENT DOCUMENTS 927,738 7/1909 Malaby ..... 135/110
3,175,650 3/1965 Hartford ..... 52/646
3,810,482 5/1974 Beavers ..... 135/109

*Primary Examiner*—John E. Murtagh
*Attorney, Agent, or Firm*—Diller, Ramik & Wight

[57] ABSTRACT

A collapsable, articulated wall structure is formed from pivotally interconnected links. In an erected configuration, the wall has a generally planar face which is suitable for hanging display posters. In a collapsed configuration, the wall folds into a compact bundle of generally parallel links. The wall is comprised of a plurality of rectangular parallelpiped sections. Each section has a first plurality of pivots in the four corners defining a face of the section and a second plurality of pivots on the other four corners of the section. The first plurality of pivots is connected with the second plurality of pivots by a plurality of side links which are pivotally interconnected in an X-shaped arrangement. Displaced slightly inward from the face plane is a face pivot which is connected to the first plurality of pivots by four face links. The section is releasably locked in its erected configuration by a locking link. The locking link is pivotally connected at one end to one of the face links and at its other end to one of the second plurality of pivots.

17 Claims, 9 Drawing Figures

FIG. 1A
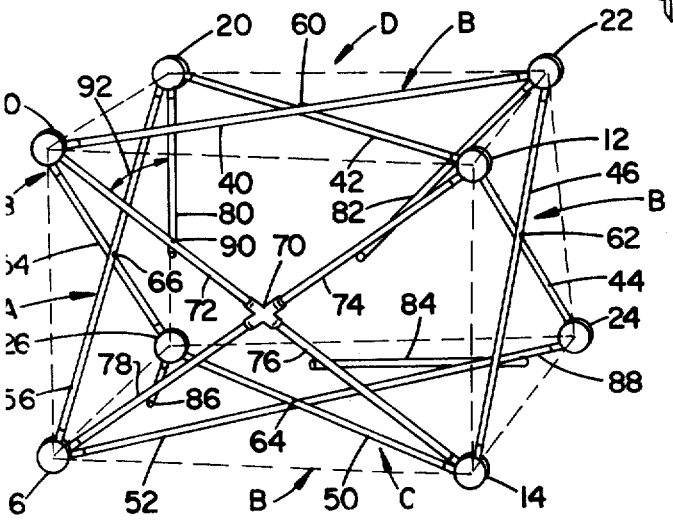
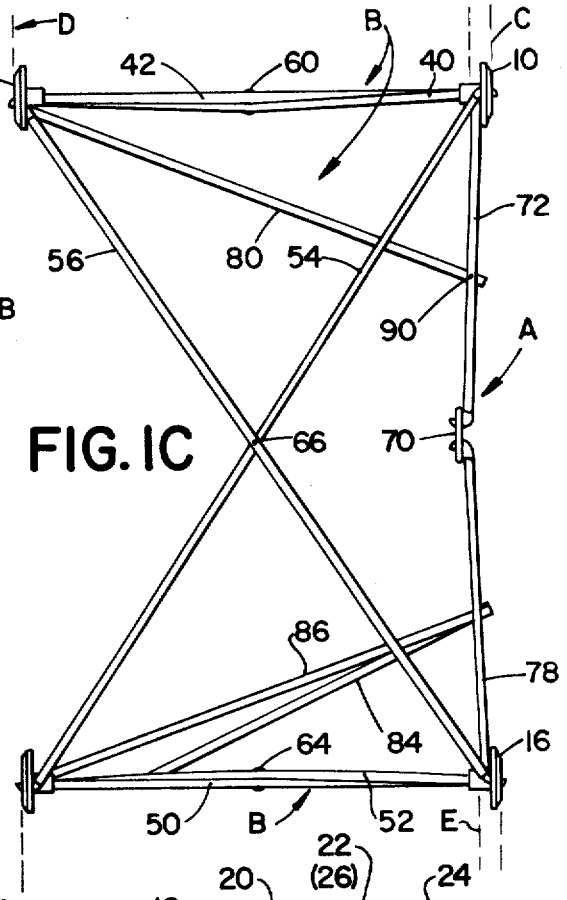
FIG. 1C
FIG. 1B
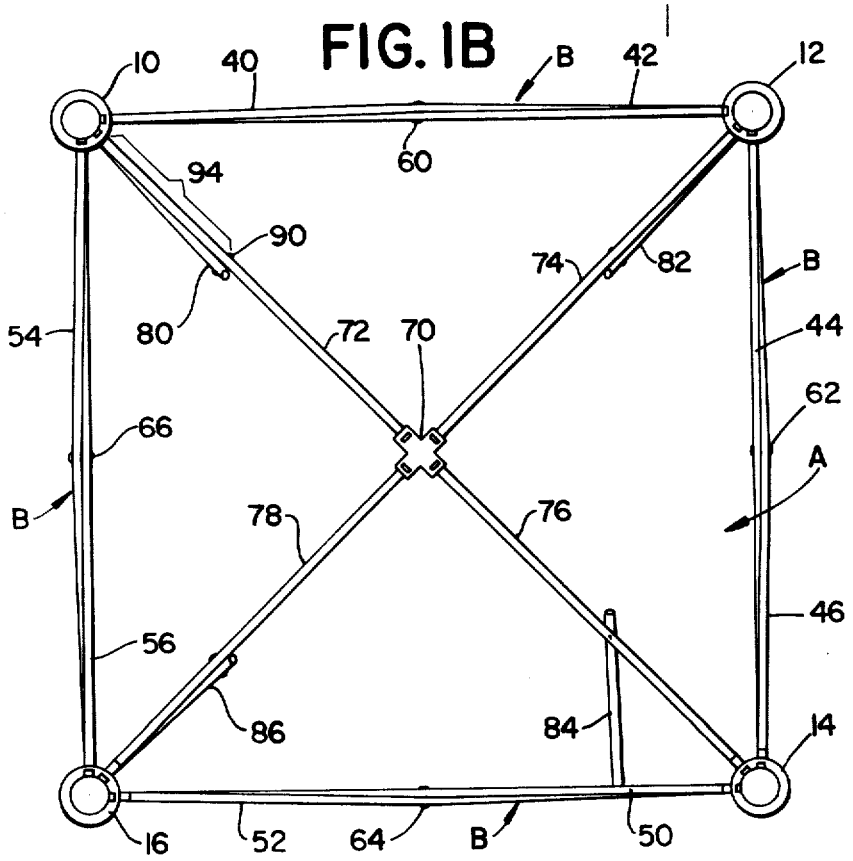
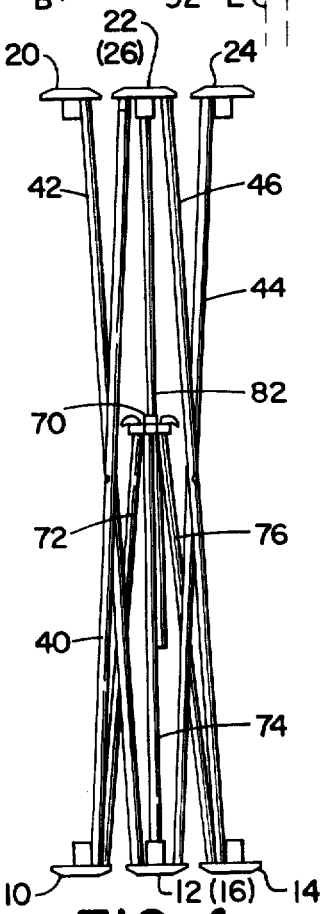
FIG. 4

FIG. 2A
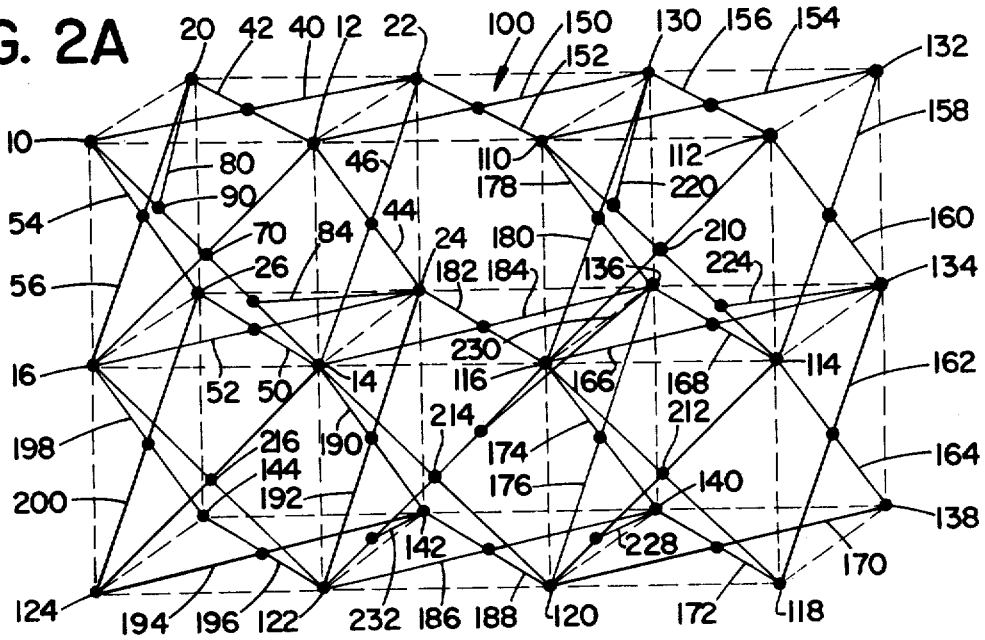
FIG. 2B
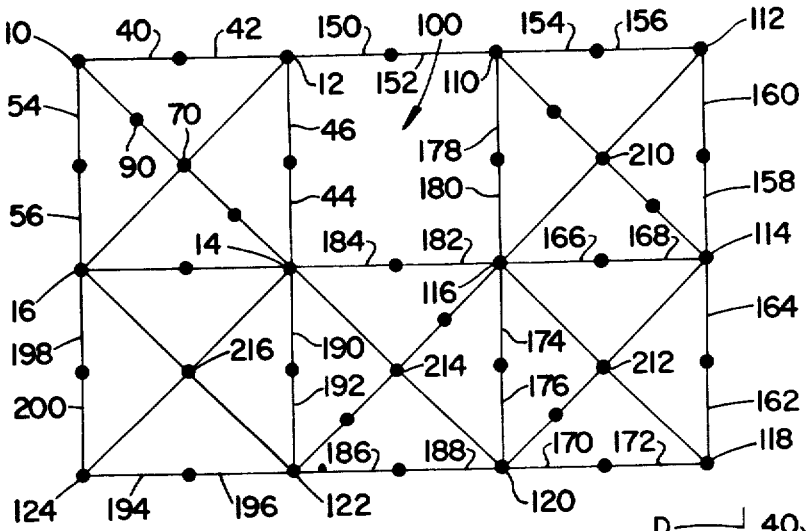
FIG. 3A
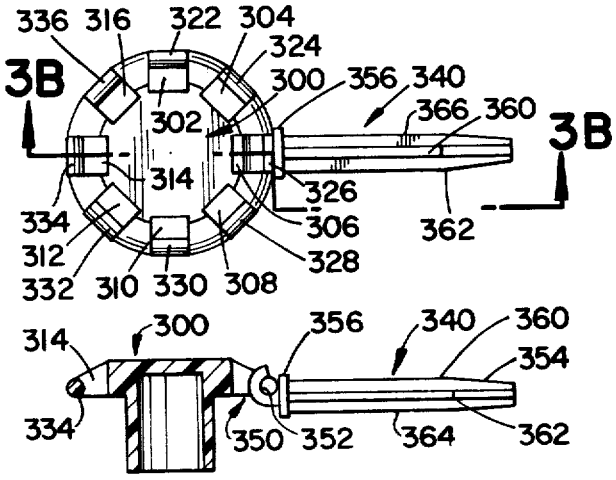
FIG. 3B
FIG. 2C
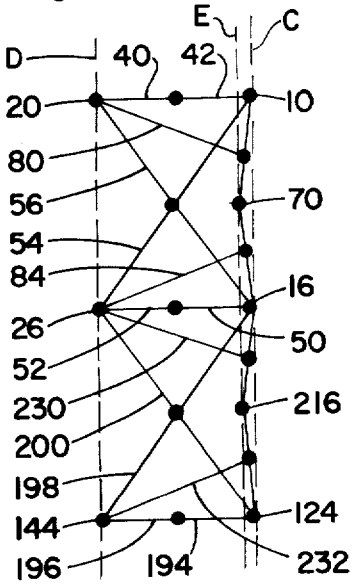

COLLAPSIBLE ARTICULATED WALL STRUCTURE

Matter enclosed in heavy brackets [ ] appears in the original patent but forms no part of this reissue specification; matter printed in italics indicates the additions made by reissue.

BACKGROUND OF THE INVENTION

This application pertains to the art of collapsable, articulated structures and more particularly, to the art of collapsable, articulated structural sections and wall units. The invention is particularly applicable to folding wall panels for trade show displays and the like, and will be described with particular reference thereto. It will be appreciated, however, that the invention has other applications such as portable desks, tables, racks, partitions, and the like.

Collapsable, articulated structures generally consist of a plurality of links, often in the form of lightweight, hollow rods. The links are interconnected with pivot joints, slip joints, other forms of moveable interconnections, and the like. The structures are commonly moveable between an erected configuration and a collapsed configuration. In the erected configuration, a relatively large structure is formed, such as tents, shelters, or the like. In the collapsed configuration, a relatively compact arrangement is formed for easy portage.

These structures in their erected configurations, often employ arcuated, or domed, or other geometric arrangements of the links to contribute to their strength and stability. Others have suggested structures which are a complex maze of interconnected pivots and links. Examples of these prior art constructions are shown, by way of example, in U.S. Pat. Nos. 3,968,808 and 4,026,313. U.S. Pat. No. 3,968,808, for example, discloses a domed shelter constructed from a series of intermeshing pentagonal or hexagonal sections, each section being composed of crossed pairs of pivotally connected rods. U.S. Pat. No. 4,026,313 shows shelters and other structures. One embodiment shows a panel constructed from alternately disposed units shaped like truncated wedges or pyramids. The units are built of pivotally and slidingly interconnected rods.

A problem with prior art display panels has been the inclusion of arcuate dimensions rather than an essentially planar surface. The prior art panels were frequently derived from scaled down, arched structures or segments of arched or domed structures.

Another problem with the prior art structures has been their complexity and incumbent high labor and material costs. The prior art structures were commonly composed of elaborate intertwining arrays of rods. To the degree, that the structures were divisible into sections, the sections were generally intermeshing.

SUMMARY OF THE INVENTION

The present invention contemplates a new and improved collapsable, articulated structure which overcomes the above referred problems and others. It provides a structure which is simple, economical, and ideally suited for producing essentially planar surfaces.

In accordance with the present invention, there is provided a collapsed, articulated structural section which is moveable between a collapsed configuration and an erected configuration. In the erected configuration there is a first plurality of pivots disposed in a regular array substantially in a first plane. The first plurality of the pivots is adapted to be moved substantially adjacent to each other when the structure is collapsed. A second plurality of pivot means is disposed in a regular array substantially in the second plane, the second plane being substantially parallel to the first plane. The second plurality of pivots is adapted to be moved substantially adjacent to each other when the structure is collapsed. A plurality of pivotally interconnected links connects the first plurality of pivots with the second plurality of pivots. Each of the interconnected links is connected with one of the first plurality of pivots and one of the second plurality of pivots. The plurality of interconnected links is adapted to be moved into a generally parallel relationship when the structure is collapsed. A face pivot is disposed generally in or adjacent the first plane. A plurality of face links connects the face pivot with some of the first plurality of pivots. The plurality of face links is adapted to be moved to a generally parallel relationship with the pivotally interconnected links when the structure is collapsed. At least one locking assembly is pivotally connected with one of the face links and is operatively connected, directly or indirectly, with one of the second plurality of pivot means for locking the structural section in the erected configuration. The locking assembly includes a locking link which is adapted to be moved to a generally parallel relationship with the pivotally interconnected links when the structure is collapsed.

In accordance with another aspect of the invention, there is provided a collapsable, articulated wall-like structure which has a substantially planar face. The wall-like structure is constructed of a plurality of connected structural sections. At least some of the structural sections are of the design described above.

In accordance with a more limited aspect of the invention, each of the structural sections is a rectangular parallelepiped. The rectangular, parallelepiped structural sections are interconnectable to form a substantially planar wall section. Alternately, the rectangular parallelepiped structural sections are adapted to be used individually or in interconnected groups to form desks, tables, and other structures.

A principal advantage of the invention is that it forms a collapsable structure which has a substantially parallel face.

Another advantage of the invention is that it is easily erected and collapsed for rapid setup and disassembly. Further, in the collapsed condition, this structure is compact and readily portable.

Another advantage of the invention is its ease of construction. It is composed of a repeating array substantially identical subsections which are easy to construct.

BRIEF DESCRIPTION OF THE DRAWINGS

The invention can be formed in certain parts and arrangements of parts, a preferred embodiment of which is described in detail in this specification and illustrated in the accompanying drawings which form a part hereof.

FIG. 1A is a perspective drawing of a rectangular parallelepiped structural section in accordance with the present invention;

FIG. 1B is a front plan view of the structural section of FIG. 1A;

FIG. 1C is a side plan view of the structural section of FIG. 1A;

FIG. 2A is a perspective diagrameter view of a wall structure in accordance with the present invention;

FIG. 2B is a front plan view of the wall section of FIG. 2A;

FIG. 2C is a side plan view of the wall structure of FIG. 2A;

FIG. 3A is a top plane view of a hinge construction in accordance with the present invention.

FIG. 3B is a side sectional view through section line B—B of FIG. 3A; and

FIG. 4 is a perspective view of a collapsed configuration of a structure in accordance with the present invention.

DESCRIPTION OF THE PREFERRED EMBODIMENT

The drawings are for the purposes of illustrating a preferred embodiment of the invention only and not for purposes of limiting it. FIGS. 1A, B and C show a collapsable, articulated rectangular parallelepiped structural section. The rectangular parallelpiped has a face side A and four sides B. The face A and one imaginary edge of each side B lie generally in a first plane C. The opposite edge of each side B lies in a second plane D. Planes C and D are essentially parallel to each other.

The structure comprises a first plurality of pivot means disposed in a regular square array substantially in the first plane C. The first plurality of pivot means comprises a first pivot means 10, a second pivot means 12, a third pivot means 14, and a fourth pivot means 16. A second plurality of pivot means is disposed in a regular, square array substantially in the second plane D. The second plurality of pivot means comprises fifth pivot means 20, sixth pivot means 22, seventh pivot means 24, and eighth pivot means 26. Taken together, the first and second plurality of pivot means defines the eight corners of the rectangular, parallelepiped. That is, first pivot means 10, second pivot means 12, sixth pivot means 22 and fifth pivot means 20, form a first rectangular. Third pivot means 14, fourth pivot means 16, eighth pivot means 26 and seventh pivot means 24 form a second rectangle which is equal in size and parallel to the first rectangle. Similarly, second pivot means 12, third pivot means 14, seventh pivot means 24, and sixth pivot means 22; and fourth pivot means 16, first pivot means 10, fifth pivot means 20 and eighth pivot means 26 form third and fourth rectangles, respectively. The third and fourth rectangles are substantially the same size and are parallel to each other.

Connecting the first and second plurality of pivot means are a plurality of pivotally interconnected side links. The plurality of interconnected side links includes side links 40 and 42 which connect first pivot means 10 with sixth pivot means 22 and fifth pivot means 20 with second pivot means 12, respectively. A side link 44 and a side link 46 connect second pivot means 12 with seventh pivot means 24 and third pivot means 14 with sixth pivot means 22, respectively. A side link 50 and a side link 52 connect third pivot means 14 with eighth pivot means 26 and fourth pivot means 16 with seventh pivot means 24, respectively. A side link 54 and a side link 56 connect first pivot means 10 with eighth pivot means 26 and fourth pivot means 16 with the fifth pivot means 20, respectively. Side links 40, 42, 44, 46 50, 52, 54 and 56 in the preferred embodiment, are sections of tubular aluminum tubing, but may be made of other materials.

Side link 40 and side link 42 are interconnected in a generally X-shaped configuration with a pivot 60. Side link 44 and side link 46 are interconnected in a generally X-shaped configuration with a pivot 62. Side link 50 and side link 52 are interconnected in a generally X-shaped configuration with a pivot 64. Side link 54 and side link 56 are interconnected in a generally X-shaped configuration with a pivot 66. Pivots 60, 62, 64 and 66 need only allow rotation between the side links which they connect within a single side plane. Accordingly, a simple pivot pin such as a rivet through both the joined links perpendicular thereto is adequate for this purpose.

A face pivot means 70 is located generally in plane C. In the preferred embodiment, face pivot 70 is located in a plane E which is parallel to but recessed slightly towards the interior of the rectangular parallelpiped from plane C. Recessing face pivot 70 has been found to reduce the force required to collapse the structure. Face pivot means 70 is interconnected with first pivot means 10 by a face link 72, with a second pivot means 12 by a face link 74 with a third pivot means 14 by a face link 76 and with fourth pivot means 16 by a face link 78.

With reference to FIG. 4, when the structural section is collapsed, the first pivot means 10, second pivot means 12, third pivot means 14, and fourth pivot means 16 draw together, becoming generally adjacent to each other in the collapsed configuration. Similarly, the fifth pivot means 20, sixth pivot means 22, seventh pivot means 24 and eighth pivot means 26 draw together and become generally adjacent to each other in the collapsed configuration. Further, as the structure is collapsed, the first plurality of pivot means 10, 12, 14, and 16 move away from the second plurality of pivot means 20, 22, 24, and 26. Conversely, it will be seen that as the structural section is moved from the collapsed position to the erected position the first plurality of pivot means 10, 12, 14 and 16 are drawn toward the second plurality of pivot means 20, 22, 24 and 26, respectively, and the face pivot means 70 is be drawn toward first plane C. The length of face links 72, 74, 76 and 78 determines how large the square defined by first pivot means 10, second pivot means 12, third pivot means 14 and fourth pivot means 16 may expand. This, in turn, determines how close the first plurality of pivot means may approach the second plurality of pivot means. That is, the depth of the rectangular parallelepiped between first and fifth pivot means 10 and 20, for example, reaches a minimum when face pivot means 70 enters plane C. The length of face pivot means 72, 74 76 and 78 are selected relative to the lengths of the side links to determine the depth of the rectangular parallelepiped in the erected configuration.

It will be appreciated that once the rectangular parallelepiped is positioned in its erected configuration, it may collapse to the collapsed configuration under its own weight. Accordingly, a releasable locking means is provided to lock the structural section into its erected configuration when the locking means is engaged. This releasable locking means may take many forms. For example, the locking means may comprise a rod from the first pivot means 10 passing slidingly through the second pivot means 20. The rod may include a releasable mechanism which is engageable to lock pivot means 20 from sliding along the rod. In this manner, the releasable locking means could interact with the face links and the side links to hold the structure in the erected configuration. That is, face links 72, 74, 76 and 78 when in a planar arrangement could limit first pivot means 10 and fifth pivot means 20 from moving closer together while the releasable locking mechanism on the rod engages to limit the first pivot means 10 and fifth pivot means 20 from moving further apart.

In the preferred embodiment, the locking means comprises one or more locking links pivotally connected with the face links and operatively connected one of the second plurality of pivot means. FIGS. 1 A, B, and C, shows a first locking link 80 pivotally connected to face link 72 operatively connected with and fifth pivot means 20, a second locking link 82 pivotally connected to face link 74 and operatively connected sixth pivot means 22, a third locking link 84 pivotally connected to face link 76 and operatively connected seventh pivot means 24, and a fourth locking link 86 pivotally connected to face link 78 and operatively connected with eighth pivot means 26. The locking links may be directly or indirectly connected with one of the second plurality of pivot means. In the embodiment of FIGS. 1A, B, and C locking links 80, 82, and 86 are directly connected with the fifth, sixth, and eighth pivot means respectively. Locking link 84, on the other hand, is indirectly connected with seventh pivot means 24 by being pivotally connected with side link 88, which in turn is pivotally connected with the seventh pivot means.

Locking link 80 will be described in detail although it will be appreciated that the description applies to locking links 82, 84 and 86 as well. It should be noted that less than four locking links are necessary. Locking link 80 is connected to face link 72 by a pivot 90. The location of pivot 90 and the length of locking length 80 are chosen so that an angle 92 between face link 72 and locking link 80 is slightly acute. When the structural section is in the collapsed configuration, FIG. 4, locking link 80 and face link 72 are generally parallel to each other. In the collapsed configuration, angle 92 is obtuse and equal to nearly 180 degrees. As the section is erected, face link 72 pivots about first pivot means 10 towards its erected position. This moves pivot 90 about first pivot means 10 in a circular arc. Simultaneously, locking link 80 moves pivot 90 in a circular arch about fifth pivot means 20. However, the position of pivot 90 is also determined by the position of face pivot means 70 as it moves toward plane C, which in turn is controlled by the geometry between the face and the side links. Thus, the position of pivot 90 is controlled by three geometric relationships which are not generally compatible. The length of locking link 80 and the position of pivot 90 are chosen so that these three factors are in equalibrium in at least two positions—the erected configuration and the collapsed configuration. This renders these two configurations stable. The length of locking link 80 and the position of pivot 90 are also chosen so that there is at least one configuration between the erected and collapsed configurations which is unstable. That is, there is an intermediate configuration that can only be obtained if one of the three geometric constraints is violated. In the preferred embodiment, face link 72 flexes, or resiliently yields in a spring-like manner, allowing pivot 90 to move out of the above geometric constraints.

The position of pivot 90 on face link 72 can be chosen in any one of several manners. The length of a segment 94 of the face link 72 between first pivot means 10 and pivot 90 is determined by the placement of pivot 90. The lengths of segment 94 and locking link 80 should be chosen such that their sum is generally the same as the length of one of the side links. If the sum were shorter the structure would be inhibited from folding fully to its collapsed configuration. Another consideration in choosing the location of pivot 90, is that the structure is in equilibrium in both the erected and the collapsed configurations. In the preferred embodiment, this includes choosing a position for pivot 90 in which angle 92 is just slightly acute. For some erected configurations, the sum of the lengths of locking link 80 and segment 94 or the angle of angle 92 may alternately be chosen such that face link 72 is slightly flexed. This, in some configurations, may retain the structure in a state of light tension which may improve its rigidity.

In the preferred embodiment, face link 72 and locking link 80 pass through a perpendicular relationship just before reaching the erected position. The perpendicular relationship marks the maximum defection of pivot 90 from the geometric constraints. The amount of force required to move the structure through this perpendicular relationship is determined by the amount face link 72 is deflected, the elastic modulus of face link 72, the number of locking links, the geometry of the structures, and the like. By adjusting these factors, the amount of force required to erect or collapse the structure may be selected. The force should be small enough for easy erecting and collapsing, but large enough for stability in the erected configuration under normal display loads and the like.

Alternately, other spring means than the resistency of link 72 which resiliancy yield to accommodate the attempted displacement of pivot 90 near the perpendicular relationship may be employed. For example, locking link 80 can be longitudinally compressible, e.g. a helical spring section can be incorporated as a section of locking link 80. The compressive strength of the helical spring is a key parameter in determining the force required to erect and collapse the structure.

Similar considerations apply in selecting the dimensions and relationships for the alternate embodiment in which locking link 84 is indirectly connected with the seventh pivot means 24. The sum of the length of segment of face link 78 between fourth pivot means 16 and the pivotal connection with the locking link, the length of locking link 86, and the length of a segment of side link 88 between the seventh pivot means 24 and the pivotal connection of locking link 84 and side link 88 should be approximately equal to the length of one of the side links. This provides for stability in the collapsed configuration. Locking link 86 should pass through a perpendicular orientation relative to face link 78 as the structure moves from the collapsed to the erected configuration. Preferably, face link 78 resiliently yields as the perpendicular relationship is reached such that the resiliency of the face link acts as a spring to bias the structure to the erected configuration.

It will be appreciated that every link shown in FIGS. 1A, B, and C is not essential to the operation of the preferred embodiment. For example, the four locking links may be reduced to three, two, or even one locking link; the number of face links may be reduced to three or even two opposed face links. Several of the side links may also be removed.

It will be observed that the structural section described in FIGS. 1A, B, and C define a rectangular parallelepiped. The four pairs of crossed side links define four sidewalls and the face links define a face wall. The side opposite the face wall is essentially open and unobstructed. This allows the structural section used to implement various utilitarian functions. For example, a flat sheet of material could be placed on side links 40 and 42 and the section used as a desk. The unobstructed side opposite face A allows the interior of the rectangular parallelepiped head to serve as a knee hole for one using the desk. Alternately, various objects may be placed or stored in the interior of the parallelepiped.

FIGS. 2A, B and C illustrates a wall-like structure which includes the structural section of FIGS. 1A, B and C in its upper left hand corner. The wall-like structure illustrated in FIGS. 2A, B and C is composed of six sections. It will be appreciated, however, that the number of sections may be increased or decreased from this number. Further, all the sections within the wall need not be of the same construction. For example, in a section 100 in FIG. 2A, the locking links, the face links, and face pivot 70 are eliminated. It will further be appreciated that some of the sections may have other links deleted or additional links inserted.

The wall structure of FIGS. 2A, B and C has a first plurality of pivot means 10, 12, 14, 16, 110, 112, 114, 116, 118, 120, 122 and 124 which is disposed in a first substantially rectangular array in the first plane C. The wall structure has a second plurality of pivot means 20, 22, 24, 26, 130, 132, 134, 136, 138, 140, 142, and 144 which is disposed in a second substantially rectangular array on the second plane D. In the preferred embodiment, the rectangular arrays are square arrays of equal size arranged directly opposite each other. The first plurality of pivot means is connected with the second plurality of pivot means with a plurality of pivotally interconnected pairs of side links 40, 42, 44, 46, 50, 52, 54, 56, 150, 152, 154, 156, 158, 160, 162, 164, 166, 168, 170, 172, 174, 176, 178, 180, 182, 184, 186, 188, 190, 192, 194, 196, 198, and 200. Further, the wall includes a plurality of face pivot means 70, 210, 212, 214, and 216, which is disposed in a third substantially planar array. In the preferred embodiment, the third planar array is again generally a square array of the same dimensions as the square array of the first plurality of pivot means off set by half a square. Some of the elements of the face pivot array may however, be deleted. The face pivot means is connected with the pivot means of the first array by a plurality of face links. The face links are unnumbered to reduce the congestion in FIGS. 2A, B and C. A releasable locking means is provided for locking side lengths and the face links in the erected configuration. In the preferred embodiment, this locking means is a plurality of locking links in various positions within the wall-like structures. All sections of the wall, of course, need not have a locking link. In some instances, a single locking link for the entire wall may be sufficient. However, for greater stability it is recommended that several locking links be disposed in various sections in the wall. In FIGS. 2A, B and C, several locking links are illustrated at 80, 84, 220, 224, 228, 230, and 232. The number of locking links determines the amount of force required to collapse and erect the wall.

FIGS. 3A and B illustrate a preferred embodiment of one of the pivot means which comprises the first and second pluralities of pivot means and the face of pivot means. Each of the pivot means has a body portion 300. Arranged generally circumferentially around the body portion are eight apertures, 302, 304, 306, 308, 310, 312, 314 and 316. Disposed opposite the body portion 300 of each aperture is a hinge pin means 322, 324, 326, 328, 330, 332, 334, and 336. Each of the hinge pin means is essentially a round, cylindrical section on which a pivotal connecting element 340 may pivot. Each of the pivotal connecting elements has a generally hook-shaped end 350. Each hooked end has an inner surface 352 defined by a generally circular arc segment greater than 180 degrees and of a radius to be pivotally received on the cylindrical hinge pin means. In the preferred embodiment, the arc segment is about 250 degrees.

The body portion 300 shown, is designed to connect with up to eight links. This number may be reduced, for example, by deleting some of the hinge pin means. On the face pivot means, every other hinge pin means may be deleted and the diameter of the body portion reduced. Each pivotal element 340 is adapted to be connected with one of the links. In the preferred embodiment in which the links are hollow, tubular rods, the rod receives an end 354 of the pivotal element. Adjacent the hooked portion is a collar or stop portion 356 which acts as a stop for a tubular rod-like element when end 354 of the pivotal element is inserted into a rod. The end portion 354 has four ridges, 360, 362, 364 and 366 which frictionally engage the interior of the rod. The rods may be crimped to increase the frictional engagement between the pivotal elements and the rods.

In the preferred embodiment, the pivot means including the body part 300 and the pivotal elements 340 are constructed of a strong, resilient material such as nylon. The resiliency of this polymeric material in turn, determines the length of the arc segment which defines surface 352. This surface is chosen such that a relatively large amount of force must be exerted to snap the pivotal element onto the body portion or to unsnap or disconnect the body portion from the pivotal element. The strength of the various features of the pivot means, particularly the hinge pin means and engagement of the hooked portion 350 and the hinge pin means 326, and the frictional engagement of the pivotal element 350 and the rods must be great enough to withstand the forces applied to them in erecting and collapsing the structure. The links tend to increase forces on the pivot means by acting as levers.

FIG. 4 is illustrative of the structure in the collapsed configuration. In this configuration, the structural section or wall structure is relatively compact. The links are arranged in at least a partially touching, generally parallel bundle with the first plurality of pivot means generally adjacent to each other at one end of the bundle and the second plurality of pivot means generally adjacent to each other at the other end. The size of the bundle is related to the number of sections or links, the cross-sectional dimensions of the links, the size of the pivot means, and the like. The length of the bundle is generally the length of the side links, regardless of the number of sections combined in forming a wall structure. Increasing the number of sections in a wall merely increases the circumference of the bundle.

The invention lhas been described with reference to a preferred embodiment. Obviously, modifications, alterations and other embodiments will occur to others upon reading and understanding this specification. It is my intention to include all such modifications, alterations and alternate embodiments insofar as they come within the scope of the appended claims or the equivalent thereof.

We claim:

[1. A collapsable, articulated structural section which is moveable between an erected configuration and a collapsed configuration, said structure comprising:

a first plurality of pivot means disposed to be substantially in a first plane in said erected configuration and to be substantially adjacent each other in said collapsed configuration;

a second plurality of pivot means disposed to be substantially in a second plane in said erected configuration and to be substantially adjacent each other in said collapsed configuration, said second plane being substantially parallel to said first plane;

a plurality of pivotally interconnected side links for connecting said first plurality of pivot means with said second plurality of pivot means, each of said links being connected with one of said first plurality of pivot means and one of said second plurality of pivot means;

a face pivot means;

a plurality of face links, each of said face links connected with said face pivot means and with one of said first plurality of pivot means; and a locking link for locking the structural section in said erected configuration, said locking link being pivotally connected near one of its ends with a first one of said plurality of face links and operatively connected near the other of its ends with a first one of said second plurality of pivot means.]

[2. The structural section as set forth in claim 1 wherein said locking link is pivotally connected directly with the first one of said second plurality of pivot means.]

3. [The structural section as set forth in claim 1 wherein] *A collapsable, articulated structural section which is moveable between an erected configuration and a collapsed configuration, said structure comprising:*

*a first plurality of pivot means disposed to be substantially in a first plane in said erected configuration and to be substantially adjacent each other in said collapsed configuration;*

*a second plurality of pivot means disposed to be substantially in a second plane in said erected configuration and to be substantially adjacent each other in said collapsed configuration, said second plane being substantially parallel to said first plane;*

*a plurality of pivotally interconnected side links for connecting said first plurality of pivot means with said second plurality of pivot means, each of said links being connected with one of said first plurality of pivot means and one of said second plurality of pivot means;*

*a face pivot means;*

*a plurality of face links, each of said face links connected with said face pivot means and with one of said first plurality of pivot means; and*

*a locking link for locking the structural section in said erected configuration, said locking link being pivotally connected near one of its ends with a first one of said plurality of face links and operatively connected near the other of its ends with a first one of second plurality of pivot means,* said locking link [is] *being* pivotally connected with one of said pivotally interconnected side links which, in turn, is pivotally connected to the first one of said second plurality of pivot means.

[4. The structural section as set forth in claim 1 wherein said locking link is disposed generally parallel to said first one of said face links in the collapsed configuration, and wherein said locking link becomes disposed in a perpendicular relationship to said first one of said face links as the section is moved from the collapsed configuration to said erected configuration.]

[5. The structural section as set forth in claim 4 wherein said locking link is disposed at an acute angle relative to said first one of said face links when the structure is in said erected configuration.]

[6. The structural section as set forth in claim 4 wherein said locking link has a length that is longer than the distance from the first one of the second plurality of pivot means normal to the first one of said face links when said locking link is disposed in the perpendicular relationship and further including spring means for resiliently yielding to accommodate part of the length of the locking link, whereby a force sufficient to overcome the resilient yielding of the spring means is required to move the structural section between its erected and collapsed configurations.]

[7. The structural section as set forth in claim 6 wherein said first one of said face links is flexible perpendicular to its length, said spring means being the flexing of said first one of said face links.]

8. [The structural section as set forth in claim 1.] *A collapsable, articulated structural section which is movable between an erected configuration and a collapsed configuration, said structure comprising:*

*a first plurality of pivot means disposed to be substantially in a first plane in said erected configuration and to be substantially adjacent each other in said collapsed configuration;*

*a second plurality of pivot means disposed to be substantially in a second plane in said erected configuration and to be substantially adjacent each other in said collapsed configuration, said second plane being substantially parallel to said first plane;*

*a plurality of pivotally interconnected side links for connecting said first plurality of pivot means with said second plurality of pivot means, each of said links being connected with one of said first plurality of pivot means and one of said second plurality of pivot means;*

*a face pivot means;*

*a plurality of face links, each of said face links connected with said face pivot means and with one of said first plurality of pivot means; and*

*a locking link for locking the structural section in said erected configuration, said locking link being pivotally connected near one of its ends with a first one of said plurality of face links and operatively connected near the other of its ends with a first one of said second plurality of pivot means* in combination with additional structural sections, each of said additional sections having a first plurality of pivot means disposed substantially in said first plane and a second plurality of pivot means disposed substantially in said second plane, the structural section being interconnected with at least some of said additional structural sections by having in common with each other, at least one pivot means of said first plurality of pivot means and at least one pivot means of said second plurality of pivot means, whereby the sections define a generally planar wall-like structure, *a plurality of said additional structural sections each also including a face pivot means and a plurality of face links connected with such face pivot means and with one of said first plurality of pivot means, and all of the face pivot means of the generally planar wall-like structure being disposed generally adjacent or in said first plane.*

9. [The structural section as set forth in claim 1,] *A collapsable, articulated structural section which is movable*

*between an erected configuration and a collapsed configuration, said structure comprising:*

*a first plurality of pivot means diposed to be substantially in a first plane in said erected configuration and to be substantially adjacent each other in said collapsed configuration;*

*a second plurality of pivot means disposed to be substantially in a second plane in said erected configuration and to be substantially adjacent each other in said collapsed configuration, said second plane being substantially parallel to said first plane;*

*a plurality of pivotally interconnected side links for connecting said first plurality of pivot means with said second plurality of pivot means, each of said links being connected with one of said first plurality of pivot means and one of said second plurality of pivot means* in which at least one of said pivot means comprises:

a body portion;

a plurality of apertures disposed generally circumferentially around said body portion;

each of said apertures being defined on one side by a hinge pin means;

a plurality of pivotal elements, each pivotal element having a generally hooked end, the hooked end having an inside surface defined by a substantially circular arc segment greater than 180 degrees and of a radius to be pivotally received on one of said hinge pin means, each pivotal element having another end adapted to be connected with one of said links, whereby each pivotal element is adapted to connect one of said links for pivotal movement about one of said hinge pin means.

[10. A collapsable, articulated rectangular parallelepiped structural section, the parallelepiped being defined by first, second, third, fourth, fifth, sixth, seventh, and eighth corners, the structured section being moveable between a collapsed configuration and an erected configuration, in said collapsed configuration said first, second, third and fourth corners being disposed generally adjacent each other and said fifth, sixth, seventh, and eighth corners being disposed generally adjacent each other, and in said erected configuration said first, second, third, and fourth corners being disposed to define substantially a first rectangle in substantially a first plane and said fifth, sixth, seventh, and eighth corners being disposed to define substantially a second rectangular in substantially a second plane, said structural section comprising:

first, second, third and fourth pivot means disposed respectively at said first, second, third and fourth corners;

fifth, sixth, seventh, and eighth pivot means disposed respectively at said fifth, sixth, seventh and eighth corners;

a plurality of pivotally interconnected side links connecting said first, second, third, and fourth pivot means with said fifth, sixth, seventh, and eighth pivot means;

a face pivot means connected by a first face link with said first pivot means and by a second face link with said third pivot means, said first and second face links being dimensioned such that when the structure is in said erected configuration, said face pivot means is disposed generally adjacent or in said first plane; and a locking link for locking the structural section in the erected configuration, said locking link being pivotally connected with said first face link and with said fifth pivot means.]

11. [The structural section as set forth in claim 10 in which] *A collapsable, articulated rectangular parallelepiped section, the parallelepiped being defined by first, second, third, fourth, fifth, sixth, seventh, and eighth corners, the structured section being movable between a collapsed configuration and an erected configuration, in said collapsed configuration said first, second, third and fourth corners being disposed generally adjacent each other and said fifth, sixth, seventh, and eighth corners being disposed generally adjacent each other, and in said erected configuration said first, second, third, and fourth corners being disposed to define substantially a first rectangle in substantially a first plane and said fifth, sixth, seventh, and eighth corners being disposed to define substantially a second rectangle in substantially a second plane, said structural section comprising:*

*first, second, third and fourth pivot means disposed respectively at said first, second, third and fourth corners;*

*fifth, sixth, seventh, and eighth pivot means disposed respectively at said fifth, sixth, seventh and eighth corners;*

*a plurality of pivotally interconnected side links connecting said first, second, third, and fourth pivot means with said fifth, sixth, seventh, and eighth pivot means;*

*a face pivot means connected by a first face link with said first pivot means and by a second face link with said third pivot means, said first and second face links being dimensioned such that when the structure is in said erected configuration, said face pivot means is disposed generally adjacent or in said first plane; and*

*a locking link for locking the structural section in the erected configuration, said locking link being pivotally connected with said first face link and with said fifth pivot means,* said locking [means is] *link being* a locking link pivotally connected at one of it ends with the fifth pivot means and at another of its ends with the first face link.

[12. The structural section as set forth in claim 10 further including a third face link connected with said face pivot means and said second pivot means and a fourth face link connected with said face pivot means and said fourth pivot means.]

[13. The structural section as set forth in claim 10 wherein said plurality of interconnected links comprises at least a first side link connected with said first pivot means and with said sixth pivot means, a second side link connected with said second pivot means and with said fifth pivot means, said second side link being pivotally connected with said first side link in a generally X-shaped configuration; a third side link connected with said second pivot means and with said third pivot means and said sixth pivot means, said fourth side link being pivotally connected with said third side in a generally X-shaped configuration said first, second, third and fourth side links each being the same length.]

14. [The structural section as set forth in claim 13 in which] *A collapsable, articulated rectangular parallelepiped structural section, the parallelepiped being defined by first, second, third, fourth, fifth, sixth, seventh, and eighth corners, the structured section being movable between a collapsed configuration and an erected configuration, in said collapsed configuration said first, second, third and fourth corners being disposed generally adjacent each other and said fifth, sixth, seventh, and eighth corners being disposed generally adjacent each other, and in said erected*

*configuration said first, second, third, and fourth corners being disposed to define substantially a first rectangle in substantially a first plane and said fifth, sixth, seventh, and eighth corners being disposed to define substantially a second rectangle in substantially a second plane, said structural section comprising:*

*first, second, third and fourth pivot meand disposed respectively at said first, second, third and fourth corners;*

*fifth, sixth, seventh, and eighth pivot means disposed respectively at said fifth, sixth, seventh and eighth corners;*

*a plurality of pivotally interconnected side links connecting said first, second, third, and fourth pivot means with said fifth, sixth, seventh, and eighth pivot means;*

*a face pivot means connected by a first face link with said first pivot means and by a second face link with said third pivot means, said first and second face links being dimensioned such that when the structure is in said erected configuration, said face pivot means is disposed generally adjacent or in said first plane; and*

*a locking link for locking the structural section in the erected configuration, said locking link being pivotally connected with said first face link and with said fifth pivot means, said plurality of interconnected links comprising at least a first side link connected with said first pivot means and with said sixth pivot means, a second side link connected with said second pivot means and with said fifth pivot means, said second side link being pivotally connected with said first side link in a generally X-shaped configuration; a third side link connected with said second pivot means and with said third pivot means and said sixth pivot means, said fourth side link being pivotally connected with said third side in a generally X-shaped configuration said first, second, third and fourth side links each being the same length,* said locking means [comprises] *comprising* a segment of said second side link, said segment being pivotally connected at one end with said fifth pivot means and at another end with a locking link, said locking link being pivotally connected at one end with said segment and at another end with said first face link.

[15. The structural section as set forth in claim 13 wherein said plurality of interconnected links further comprises a fifth side link connected with said third pivot means and with said eighth pivot means, a sixth side link connected with said fourth pivot means and with said seventh pivot means, said sixth side link being pivotally connected with said fifth side link in a generally X-shaped configuration, a seventh side link connected with said first pivot means and with said eighth pivot means and an eighth side link connected with said fourth pivot means and said fifth pivot means, said eighth side link being pivotally connected with said seventh side link in a generally X-shaped configuration.]

16. The structural section as set forth in claim 11 wherein the sum of the length of the locking link and the distance along said first face link between the first pivot means and the pivotal connection of the first face link and said locking link is substantially equal to the length of one of said plurality of pivotally interconnected links.

17. The structural section as set forth in claim 14 wherein the sum of the length of the locking link, the segment, and the distance along the first face link between the first pivot means and the pivotal connection of the first face link and the locking link is substantially equal to the length of said first side link.

[18. The structural section as set forth in claim 10 wherein in the erected configuration, said first, second, third, and fourth corners define a first square in said first plane and said fifth, sixth, seventh, and eighth corners define a second square, said second square being the same size as said first square.]

19. The structural section as set forth in claim 11 wherein said locking link is disposed generally parallel to said first face link in the collapsed configuration and becomes disposed in a generally perpendicular relationship to said first face link as the section is moved from the collapsed configuration to said erected configuration.

20. The structural section as set forth in claim 19 wherein said locking link has a length that is longer than the distance from the pivotal means normal to said first face link when said locking link is disposed in the perpendicular relationship and further including spring means for resiliently yielding to accommodate part of the length of the locking link, whereby a force sufficient to overcome the resilient yielding of the spring means is required to move the structural section between its erected and collapsed configurations.

21. [The structural section as set forth in claim 10] *A collapsable, articulated rectangular parallelepiped structural section, the parallelepiped being defined by first, second, third, fourth, fifth, sixth, seventh, and eighth corners, the structured section being movable between a collapsed configuration and an erected configuration, in said collapsed configuration said first, second, third and fourth corners being disposed generally adjacent each other and said fifth, sixth, seventh, and eighth corners being disposed generally adjacent each other, and in said erected configuration said first, second, third, and fourth corners being disposed to define substantially a first rectangle in substantially a first plane and said fifth, sixth, seventh, and eighth corners being disposed to define substantially a second rectangle in substantially a second plane, said structural section comprising:*

*first, second, third and fourth pivot means disposed respectively at said first, second, third and fourth corners;*

*fifth, sixth, seventh, and eighth pivot means disposed respectively at said fifth, sixth, seventh and eighth corners;*

*a plurality of pivotally interconnected side links connecting said first, second, third, and fourth pivot means with said fifth, sixth, seventh, and eighth pivot means;*

*a face pivot means connected by a first face link with said first pivot means and by a second face link with said third pivot means, said first and second face links being dimensioned such that when the structure is in said erected configuration, said face pivot means is disposed generally adjacent or in said first plane; and*

*a locking link for locking the structural section in the erected configuration, said locking link being pivotally connected with said first face link and with said fith pivot means* in combination with additional structural sections so as to form a wall structure in the erected configuration and a plurality of generally parallel links in the collapsed configuration, *each of said additional sections having a first plurality of pivot means disposed substantially in said first plane and a second plurality of pivot means disposed substantially in said second plane, the structural section being interconnected with at least some of said additional struc-*

*tural sections by having in common with each other, at least one pivot means of said first plurality of pivot means and at least one pivot means of said second plurality of pivot means, whereby the sections define a generally planar wall-ike structure, a plurality of said additional structural sections each also including a face pivot means and a plurality of face links connected with such face pivot means and with one of said first plurality of pivot means, and all of the face pivot means of the generally planar wall-like structure being disposed generally adjacent or in said first plane.*

22. [The structural section as set forth in claim 10,] *A collapsable, articulated rectangular parallelepiped structural section, the parallelpiped being defined by first, second, third, fourth, fifth, sixth, seventh, and eighth corners, the structured section being movable between a collapsed configuration and an erected configuration, in said collapsed configuration said first, second, third and fourth corners being disposed generally adjacent each other and said fifth, sixth, seventh, and eighth corners being disposed generally adjacent each other, and in said erected configuration said first, second, third, and fourth corners being disposed to define substantially a first rectangle in substantially a first plane and said fifth, sixth, seventh, and eighth corners being disposed to define substantially a second rectangle in substantially a second plane, said structural section comprising:*

*first, second, third and fourth pivot means disposed respectively at said first, second, third and fourth corners;*

*fifth, sixth, seventh, and eighth pivot means disposed respectively at said fifth, sixth, seventh and eighth corners;*

*a plurality of pivotally interconnected side links connecting said first, second, third, and fourth pivot means with said fifth, sixth, seventh, and eighth pivot means;*

*a face pivot means connected by a first face link with said first pivot means and by a second face link with said third pivot means, said first and second face links being dimensioned such that when the structure is in said erected configuration, said face pivot means is disposed generally adjacent or in said first plane; and*

*a locking link for locking the structural section in the erected configuration, said locking link being pivotally connected with said first face link and with said fifth pivot means,* in which at least one of said pivot means comprise:

a body portion;

a plurality of apertures disposed generally circumferentially around said body portion;

each of said apertures being defined on one side by a hinge pin means;

a plurality of pivotal elements, each pivotal element having a generally hooked end, the hooked end having an inside surface defined by a substantially circular arc segment greater than 180 degrees and of a radius to be pivotally received on one of said hinge pin means, each pivotal element having another end adapted to be connected with one of said links, whereby each pivotal element is adapted to connect one of said links for pivotal movement about one of said hinge pin means.

23. A collapsable, articulated wall-like structure having at least one substantially planar face, said wall structure comprising:

a first plurality of pivot means disposed in a first substantially rectangular planar array on said planar face;

a second plurality of pivot means disposed in a second substantially rectangular planar array, said second planar array being substantially parallel to said first planar array;

a plurality of pivotally interconnected pairs of side links for connecting said first plurality of pivot means with said second plurality of pivot means, each of said pairs of side links being disposed in a plane which is substantially perpendicular to said planar face;

a plurality of face pivot means disposed in a third substantially planar array, said third planar array being substantially parallel to and generally adjacent to said first planar array;

a plurality of face links for connecting said plurality of face pivot means with said first plurality of pivot means; and at least one releasable locking link for locking said side links and said face links in a fixed relationship to form said wall-like structure, said locking link adapted to release said side links and said face link from said fixed relationship to permit said side links and said face links to pivot about said pivot means into a generally parallel relationship whereby the wall-like structure may be collapsed.

24. The wall-like structure as set forth in claim 23 wherein said locking link is pivotally connected at one of its ends to one of said face links and at another of its ends to one of said second plurality of pivot means.

25. The wall-like structure as set forth in claim 24 wherein said locking link is adapted to be disposed generally perpendicular to the face link to which it is pivotally connected.

26. The wall-like structure as set forth in claim 23 wherein said locking link is pivotally connected at one of its ends with one of said side links and pivotally connected at another of its ends with one of said face links.

27. The structural section as set forth in claim 23, in which at least one of said pivot means comprise:

a body portion;

a plurality of apertures disposed generally circumferentially around said body portion;

each of said apertures being defined on one side by a hinge pin means;

a plurality of pivotal elements, each pivotal element having a generally hooked end, the hooked end having an inside surface defined by a substantially circular arc segment greater than 180 degrees and of a radius to be pivotally received on one of said hinge pin means, each pivotal element having another end adapted to be connected with one of said links, whereby each pivotal element is adapted to connect one of said links for pivotal movement about one of said hinge pin means.

[28. A collapable, articulated wall-like structure having a substantially planar face, said wall-like structure comprising a plurality of interconnected structural sections, at least some of said structural sections comprising:

a first plurality of pivot means disposed in a regular array substantially in a first plane, said first plurality of pivot means adapted to be moved substantially adjacent each other when the structure is collapsed;

a second plurality of pivot means disposed in a regular array substantially in a second plane, said second plane being substantially parallel to said first plane, said second plurality of pivot means adapted to be moved substantially adjacent each other when the structure is collapsed;

a plurality of pivotally interconnected links for connecting said first plurality of pivot means and said second plurality of pivot means, each of said links being connected with one of said first plurality of pivot means and one of said second plurality of pivot means, some of said plurality of pivotally interconnected links being common to more than one section, said plurality of interconnected links being adapted to be moved to a generally parallel relationship when the structure is collapsed;

a face pivot means disposed in or closely adjacent to said first plane;

a plurality of face links, each of said face links connected with said face pivot means and with one of said first plurality of pivot means, said plurality of face links being adapted to be moved to a generally parallel relationship with the pivotally interconnected links when the structure is collapsed; and at least one locking link for locking the structural section in said erected configuration, said locking link being pivotally connected with a first one of said plurality of face links and being operatively connected with a first one of said second plurality of pivot means, said locking link being adapted to be moved to a generally parallel relationship with the pivotally interconnected links when the structure is collapsed.]

*29. The wall-like structure as set forth in claim 23 wherein the length of said face links is selected relative to the length of said side links to determine the depth of the wall-like structure by limiting how close said first pivot means and said second pivot means may approach each other when said face pivot means enter said planar face, and said releasable locking link including releasable locking mechanism limiting said first pivot means and said second pivot means from moving further apart.*

* * * * *